(12) United States Patent
Dong et al.

(10) Patent No.: US 11,077,530 B2
(45) Date of Patent: Aug. 3, 2021

(54) APPARATUS AND METHOD FOR ASSEMBLING OPTICAL MODULE

(71) Applicant: GOERTEK INC., Shandong (CN)

(72) Inventors: Nanjing Dong, Weifang (CN); Debo Sun, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 16/652,353

(22) PCT Filed: Sep. 6, 2018

(86) PCT No.: PCT/CN2018/104384
§ 371 (c)(1),
(2) Date: Mar. 30, 2020

(87) PCT Pub. No.: WO2019/076157
PCT Pub. Date: Apr. 25, 2019

(65) Prior Publication Data
US 2020/0269367 A1 Aug. 27, 2020

(30) Foreign Application Priority Data
Oct. 17, 2017 (CN) .......................... 201710965649.0

(51) Int. Cl.
*B23P 19/10* (2006.01)
*B25J 9/16* (2006.01)
(Continued)

(52) U.S. Cl.
CPC ............. *B23P 19/10* (2013.01); *B23P 19/006* (2013.01); *B23P 21/004* (2013.01); *B25J 9/1697* (2013.01); *B23P 19/04* (2013.01); *B23P 19/105* (2013.01); *B23P 19/107* (2013.01); *B23P 21/008* (2013.01); *B25J 9/1687* (2013.01);
(Continued)

(58) Field of Classification Search
CPC ......... B23P 19/006; B23P 19/04; B23P 19/10; B23P 19/105; B23P 19/107; B23P 21/004; B23P 21/008; B25J 9/1697; B25J 9/1687; B25J 15/0616; B25J 19/023; Y10T 29/53052
See application file for complete search history.

(56) References Cited

U.S. PATENT DOCUMENTS

| 6,606,784 B1 | 8/2003 | Huff et al. |
| 2009/0031560 A1* | 2/2009 | Tomioka ............... B23Q 7/1426 29/791 |
| 2017/0112028 A1* | 4/2017 | Millman ................. B31B 50/46 |

FOREIGN PATENT DOCUMENTS

| CN | 101105564 A | 1/2008 |
| CN | 201594862 U | 9/2010 |

(Continued)

*Primary Examiner* — Jermie E Cozart
(74) *Attorney, Agent, or Firm* — Maschoff Brennan

(57) ABSTRACT

Provided are an apparatus and a method for assembling optical module. The apparatus includes: a working bench, a controller and a plurality of mechanical components for active alignment of optical modules; a conveying mechanism is provided on the working bench, and a plurality of fixtures are provided on the conveying mechanism with even space therebetween and are movable with the conveying mechanism; the plurality of mechanical components are configured to perform corresponding operations on the fixtures moved to respective operating positions under control of the controller.

15 Claims, 8 Drawing Sheets

(51) Int. Cl.
*B23P 19/00* (2006.01)
*B23P 21/00* (2006.01)
*B23P 19/04* (2006.01)
*B25J 19/02* (2006.01)
*B25J 15/06* (2006.01)

(52) U.S. Cl.
CPC .......... *B25J 15/0616* (2013.01); *B25J 19/023* (2013.01); *Y10T 29/53052* (2015.01)

(56) References Cited

FOREIGN PATENT DOCUMENTS

| | | |
|---|---|---|
| CN | 105721859 A | 6/2016 |
| CN | 107838672 A | 3/2018 |

\* cited by examiner

APPARATUS AND METHOD FOR ASSEMBLING OPTICAL MODULE

CROSS-REFERENCE TO RELATED APPLICATIONS

This application claims priority to Chinese Patent Application No. 201710965649.0, filed Oct. 17, 2017, entitled "Apparatus and Method for Assembling Optical Module", which is hereby incorporated by reference in its entirety.

TECHNICAL FIELD

The present disclosure relates to a field of assembling, and particularly relates to an apparatus and a method for assembling optical module.

BACKGROUND

Nowadays, there are more and more optical modules with independent functions in the market to meet diversified market demands. These optical modules may be embedded into other devices to perform their functions, such as camera modules, micro-projection modules, LED (Light Emitting Diode) optical modules, and VR (Virtual Reality)/AR (Augmented Reality) optical modules.

Generally, an optical module is obtained by assembling a plurality of optical elements and other parts. For example, a camera module may be obtained by assembling components such as image sensors, lens mounts, a plurality of lenses, and circuit boards. More particularly, an accuracy in assembling the lens plays a decisive role in an optical performance of an optical module.

However, methods for assembling optical module in the prior art cannot perform well in both accuracy and efficiency in assembling.

BRIEF SUMMARY

In view of this, the present disclosure provides an apparatus and a method for assembling optical module, so that the accuracy in assembling optical modules can be improved with improved efficiency in assembling.

In one embodiment of the present disclosure, an apparatus for assembling optical module is provided. The apparatus includes:

a working bench, a controller and a plurality of mechanical components for active alignment of optical modules;

a conveying means is provided on the working bench, and a plurality of fixtures are provided on the conveying means with even space therebetween and are movable with the conveying means; wherein a positionale relationship between two adjacent mechanical components of the plurality of mechanical components is determined by the positional relationship between two adjacent fixtures of the plurality of fixtures; the controller is configured to control a movement of the conveying means, and control the conveying means to stop every time the conveying means moves over a preset distance, and control the plurality of mechanical components to perform corresponding operations on the fixtures moved to respective operating positions; the plurality of mechanical components are configured to perform corresponding operations on the fixtures moved to respective operating positions under control of the controller.

In some embodiments, the plurality of mechanical components include: a manipulator, an alignment mechanism, a power supply, a first image collecting means, and a dispensing mechanism. The manipulator is configured to place a to-be-assembled optical part on a fixture moved to the operating position of the manipulator. The dispensing mechanism is configured to perform dispensing on the to-be-assembled optical part moved to the operating position of the dispensing mechanism. The alignment mechanism is configured to place a to-be-assembled lense to the to-be-assembled optical part moved to the operating position of the alignment mechanism to obtain a optical module to be aligned, and adjust a position of the to-be-assembled lense according to an aligning instruction of the controller. The power supply is configured to supply power to the to-be-assembled optical part moved to the operating position of the alignment mechanism, so that the optical module to be aligned generates an image. The first image collecting means is configured to collect a light spot of the image generated by the optical module to be aligned and feed it back to the controller. The controller is configured to generate an aligning instruction according to the quality of the light spot and output the aligning instruction to the alignment mechanism.

In some embodiments, a power supply carrying mechanism is provided on the working bench. The power supply carrying mechanism is configured to carry an outputting of the power supply to a power inputting of the to-be-assembled optical part moved to the operating position of the alignment mechanism.

In some embodiments, the alignment mechanism includes: a first robot arm electrically connected to the controller, and an aligning head provided on the first robot arm, the aligning head includes: a vacuum chuck or an adjustable mechanical clamp.

In some embodiments, the alignment mechanism further includes: an integration mechanism, which is connected with the first robot arm, and is configured to integrate a plurality of aligning heads on the first robot arm.

In some embodiments, the dispensing mechanism includes a second robot arm electrically connected to the controller, and a UV dispensing syringe mounted on the second robot arm.

In some embodiments, the dispensing mechanism further includes: a second image collecting means mounted on the second robot arm.

In some embodiments, a UV lamp is provided on the alignment mechanism and electrically connected to the controller.

In some embodiments, a sensor is provided on each of the plurality of fixtures and configured to detect whether a to-be-assembled optical part is placed on the fixture.

In some embodiments, the conveying means includes: a turntable or a conveyor.

The present disclosure further provides a method for assembling optical module applicable to the apparatus for assembling optical module provided by the present disclosure. The method includes:

controlling the conveying means to stop when the conveying means moves over a preset distance;

controlling the plurality of mechanical components to perform corresponding operations on the fixtures moved to respective operating positions;

controlling the conveying means to move when the plurality of mechanical components complete corresponding operations respectively.

In some embodiments, the controlling the plurality of mechanical components to perform corresponding operations on the fixtures moved to respective operating positions includes controlling the manipulator to place a to-be-assembled optical part on a fixture moved to the operating position of the manipulator; and controlling the dispensing mechanism to perform dispensing on the to-be-assembled optical part moved to the operating position of the dispensing mechanism; and controlling the power supply to supply power to the to-be-assembled optical part moved to the operating position of the alignment mechanism; and controlling the alignment mechanism to place a to-be-assembled lense to the to-be-assembled optical part moved to the operating position of the alignment mechanism to obtain a optical module to be aligned, and controlling the alignment mechanism to adjust a position of the to-be-assembled lense according to an aligning instruction of the controller; and controlling the first image collecting means to collect a light spot of an image generated by the optical module to be aligned, and to generate an aligning instruction according to a quality of the light spot and output the aligning instruction to the alignment mechanism.

In some embodiments, before the controlling the plurality of mechanical components to perform corresponding operations on the fixtures moved to respective operating positions, the method further includes:

detecting whether a to-be-assembled optical part is placed on the fixture by a sensor provided on each of the plurality of fixtures, with respect to the each fixture.

In some embodiments, the controlling the dispensing mechanism to perform dispensing on the to-be-assembled optical part moved to the operating position of the dispensing mechanism includes: acquiring a realtime image of the to-be-assembled optical part moved to the operating position of the dispensing mechanism by a second image collecting means in the dispensing mechanism; determining a dispensing position according to the realtime image; controlling the second robot arm with a UV dispensing syringe according to the dispensing position to perform a dispensing operation.

In some embodiments, after the generating an aligning instruction according to a quality of the light spot and outputting the aligning instruction to the alignment mechanism, the method further includes: lighting a UV lamp on the alignment mechanism to irradiate at the dispensing site of the to-be-assembled optical part, so as to fix the to-be-assembled lenses to obtain an optical module.

In the present embodiments, the fixtures on the conveying means follows the movement of the conveying means, a plurality of mechanical components configured to perform active alignment on optical module may perform corresponding operations on the fixtures moved to respective operating position at the same time at multi-positions when the fixtures stop. Furthermore, the fixtures may be sequentially in each assembling operations, and a plurality of mechanical components may sequentially perform corresponding operations on the fixtures moved to its operating position, so that the accuracy in assembling optical modules can be improved with improved efficiency in assembling.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

BRIEF DESCRIPTION OF THE DRAWINGS

Drawings needed in the description of the embodiments and the prior art shall be explained below, so as to explain the technical solutions in the embodiments of the present disclosure and the prior art more clearly. It is obvious that the drawings explained below are merely some embodiments of the present disclosure, and a person of ordinary skill in the art may obtain other drawings according to these drawings without making an inventive effort.

DETAILED DESCRIPTION

In order to make the objectives, technical solutions, and advantages of the embodiments of the present disclosure clearer, the technical solutions in the embodiments of the present disclosure will be clearly and completely described with reference to the drawings in the embodiments of the present disclosure. Obviously, the described embodiments are some of the embodiments of the present disclosure, not all of the embodiments. Based on the embodiments in the present disclosure, all other embodiments obtained by one skilled in the art without making creative efforts shall fall within the protection scope of the present disclosure.

It should be noted that, in the following embodiments of the present disclosure, an optical module refers to a complete product with the alignment completed and the fixing completed; an optical module to be aligned refers to an optical module in the assembly process, which may be in a state of being unaligned or aligned; a to-be-assembled optical part refers to the semi-finished product of an optical module, and the to-be-assembled lenses needs to be aligned and assembled at its designated position and fixed to obtain an optical module. The above-mentioned concepts mentioned below may be understood with reference to the above explanations, and detailed may be omitted to avoid redundancy.

Figure 1A:
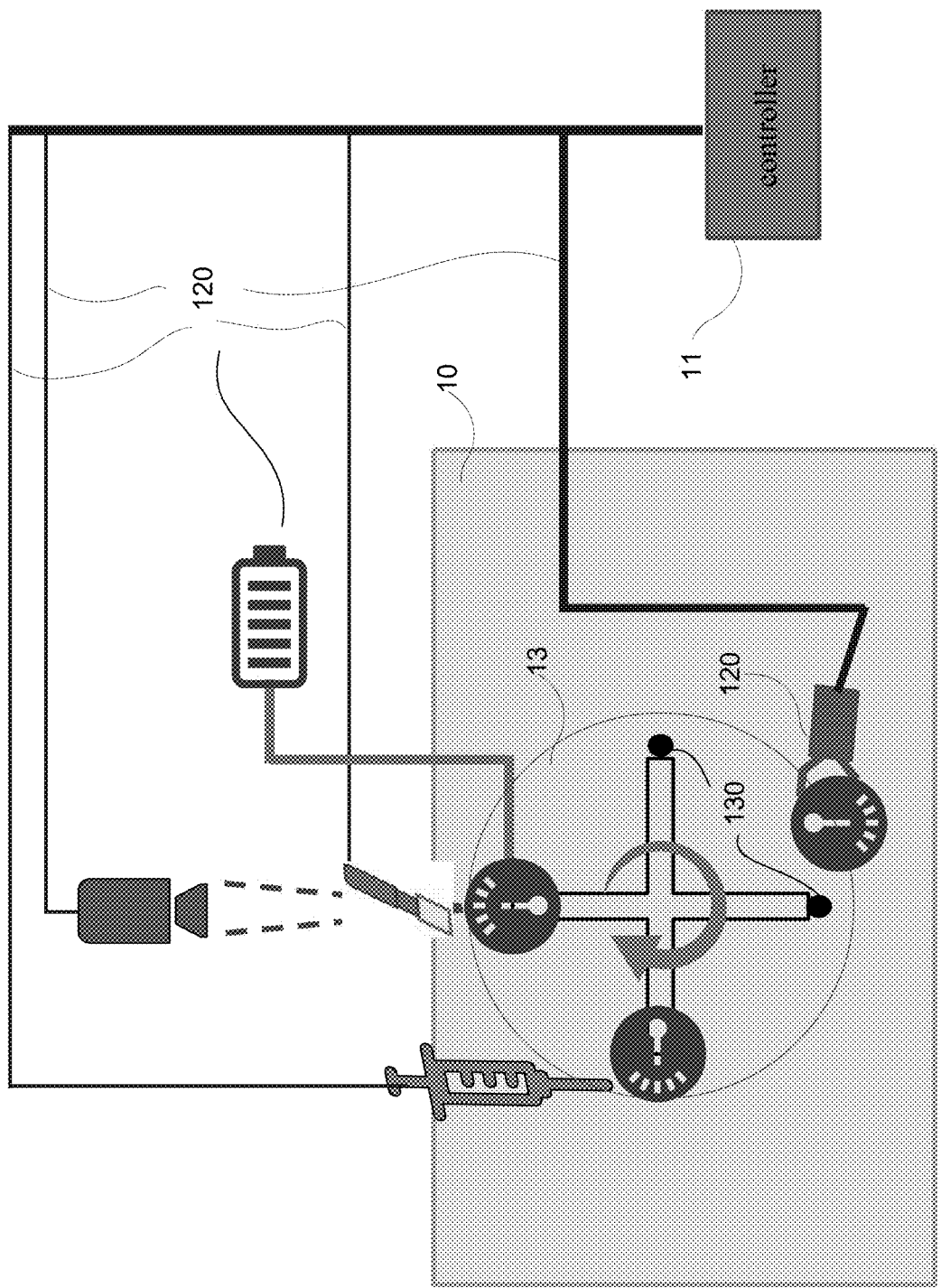
FIG. 1a is a schematic structural diagram of an apparatus for assembling optical module according to an embodiment of the present disclosure.

FIG. 1a is a schematic structural diagram of an apparatus for assembling optical module according to an embodiment of the present disclosure. With reference to FIG. 1a, the apparatus may include: a working bench 10, a controller 11 and a plurality of mechanical components 120 for active alignment of optical modules.

A conveying means 13 is provided on the working bench 10, and a plurality of fixtures 130 are provided on the conveying means 13 with even space therebetween and may follow the movement of the conveying means 13. The fixture may be a vacuum holding means or a size-adjustable clamp. The fixtures may hold the to-be-assembled optical part, to ensure that the to-be-assembled optical part is accurately placed at a designated position on the conveying device, and to ensure the stability of the to-be-assembled optical part during the movement of the conveying means 13.

Figure 1B:
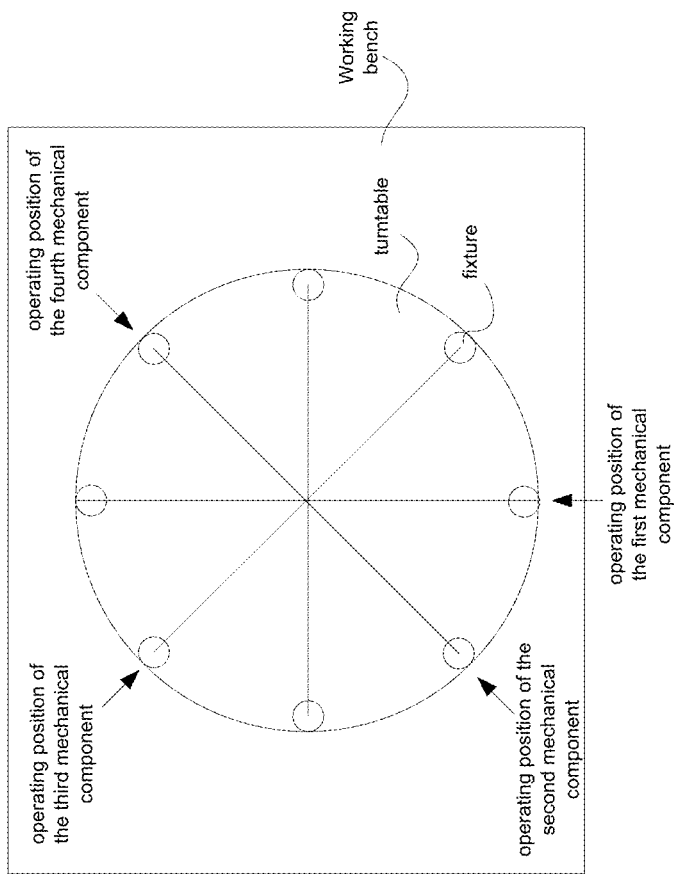
FIG. 1b is a schematic diagram of a correspondence relationship between operating positions of a plurality of mechanical components and a plurality of fixtures according to an embodiment of the present disclosure.

FIGS. 1a and 1b illustrate a conveying means 13 in a form of a turntable. The structure of the conveying means in the form of a turntable is relatively compact. In some embodiments, the conveying means 13 may also be a conveyor, such as a linearly moving conveyor belt. It should be understood that the conveying means provided in the embodiments of the present disclosure includes but is not limited to a turntable and a conveyor, and may include other movable conveying means.

Each mechanical component in the plurality of mechanical components 120 may have respective operating position. A positional relationship between two adjacent mechanical components may be determined by the positional relationship between two adjacent fixtures of the plurality of fixtures 130. In the present embodiment, the positional relationship may be represented in distance or angle.

In some embodiments, the distance between operating positions of two adjacent mechanical components is an integral multiple of a distance between two adjacent fixtures. For example, when a plurality of fixtures 130 are arranged on a linearly moving conveyor belt, if a distance between two adjacent fixtures is 10 cm, a distance between the operating positions of two adjacent mechanical components may be an integral multiple of 10 cm, such as 20 cm, 30 cm or 40 cm.

In another embodiment, an angle between operating positions of two adjacent mechanical components may be an integral multiple of an angle between two adjacent fixtures in the plurality of fixtures 130. For example, when a plurality of fixtures 130 are provided on the turntable, if an angle of two adjacent fixtures is 15°, an angle between operating positions of two adjacent mechanical components may be an integral multiple of 15°, such as 15°, 30° or 45°. As shown in FIG. 1b, in FIG. 1b, the angle between two adjacent fixtures is 45°, and the angle between operating positions of the first mechanical component and the second mechanical component is 45°, the angle between operating positions of the second mechanical component and the third mechanical component is 90°, the angle between operating positions of the third mechanical component and the fourth mechanical component is 90°. The angle between operating positions of the third mechanical component and the fourth mechanical component is 90°. Such implementation may ensure that operations may be performed at a plurality of operating positions at the same time, which may be a basis for the high efficient assembling of optical modules.

In the apparatus provided by the embodiments of the present disclosure, the controller 11 may control a movement of the conveying means 13, and control the conveying means 13 to stop every time the conveying means 13 moves by a preset angle and/or over a preset distance. More particularly, the preset angle may be equal to an angle between two adjacent fixtures, and the preset distance may be equal to a distance between two adjacent fixtures. Furthermore, after the conveying means 13 moves by a preset angle and/or over a preset distance at one time, when the conveying means 13 stops, the operating positions of a plurality of mechanical components 120 may be corresponding to fixtures, and the controller 11 may control the plurality of mechanical components 120 to perform corresponding operations on the fixtures moved to respective operating positions.

It should be noted that, in present embodiment, when the conveying means 13 begins its movement, there may be at least one fixture meeting the following settings on the conveying means 13 and the settings may be: the fixture is corresponding to any one of the plurality of mechanical components 120 in position. By adopting the foregoing embodiment, it can be ensured that when the conveying means 13 stops after each movement by a preset anble and/or over a preset distance, each of the plurality of mechanical components 120 has an operating position corresponding to a fixture. Therefore, the mechanical components may perform corresponding operations on the fixtures moved to respective operating positions under control of the controller 11.

Figure 2:
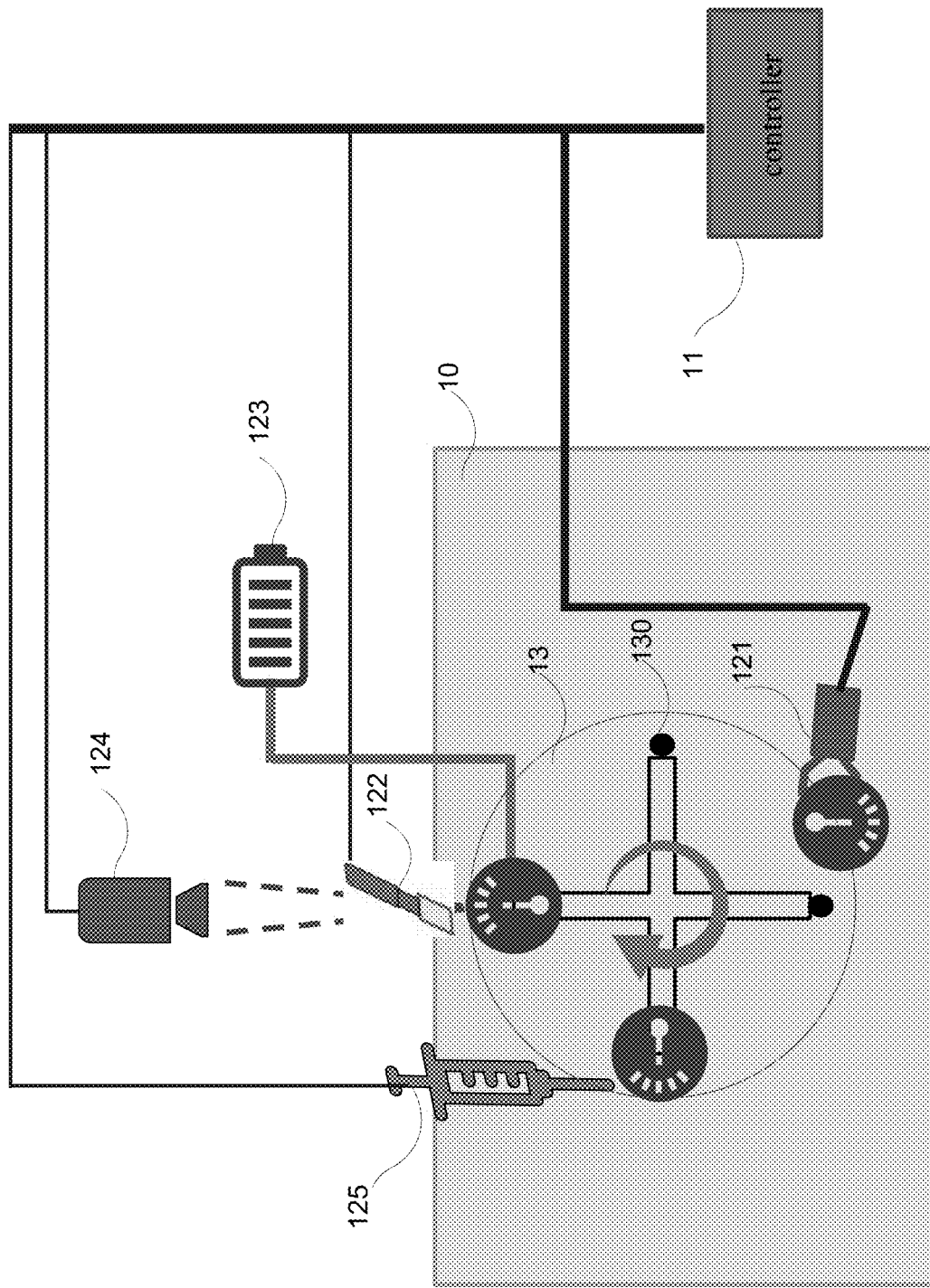
FIG. 2 is a schematic structural diagram of an apparatus for assembling optical module according to another embodiment of the present disclosure.

In some embodiments, as shown in FIG. 2, the plurality of mechanical components 120 may include: a manipulator 121, an alignment mechanism 122, a power supply 123, a first image collecting means 124, and a dispensing mechanism 125.

In some embodiments, the manipulator 121 may place a to-be-assembled optical part on a fixture moved to the operating position of the manipulator 121. More particularly, the to-be-assembled optical part may be the semi-finished product of an optical module, and the to-be-assembled lenses needs to be aligned and assembled at its designated position and fixed to obtain an optical module. The manipular 121 may include a robot arm and a vacuum chuck or a mechanical clamp provided at one end of the robot arm. More particularly, the robot arm may perform three-axis or six-axis movement under the movement instructions of the controller 11, and the vacuum chuck or a mechanical clamp may grasp a to-be-assembled optical part from the loading rack of to-be-assembled optical parts.

In some embodiments, the alignment mechanism 122 may place a to-be-assembled lense to the to-be-assembled optical part moved to the operating position of the alignment mechanism 122 to obtain a optical module to be aligned, and adjust a position of the to-be-assembled lense according to an aligning instruction of the controller 11. More particularly, the alignment mechanism 122 includes: a first robot arm electrically connected to the controller 11, and an aligning head provided on the first robot arm. The aligning head may be a vacuum chuck or an adjustable mechanical clamp without limitation in the present disclosure.

In some embodiments, it may be necessary to assemble two or more optical lenses into a to-be-assembled optical part. One possible way is to assemble the lenses one by one and the other way is to assemble the plurality of lenses at the same time. It is necessary for a plurality of aligning heads to hold the to-be-assembled lenses respectively.

Figure 3A:
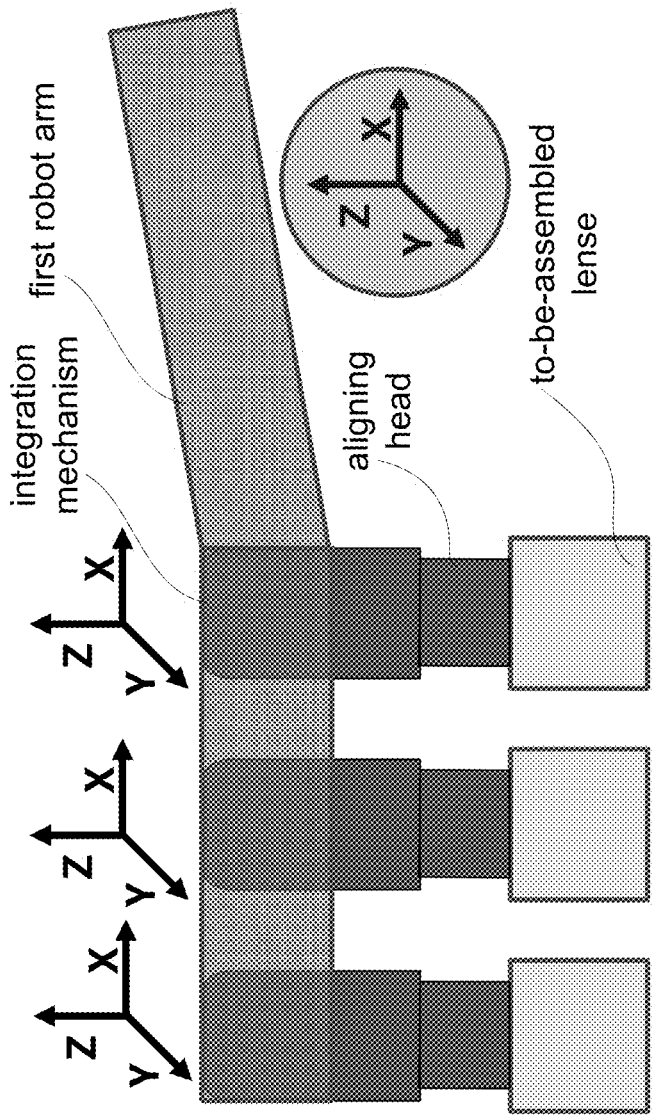
FIG. 3a is a schematic structural diagram of an alignment mechanism 122 according to an embodiment of the present disclosure.
Figure 3B:
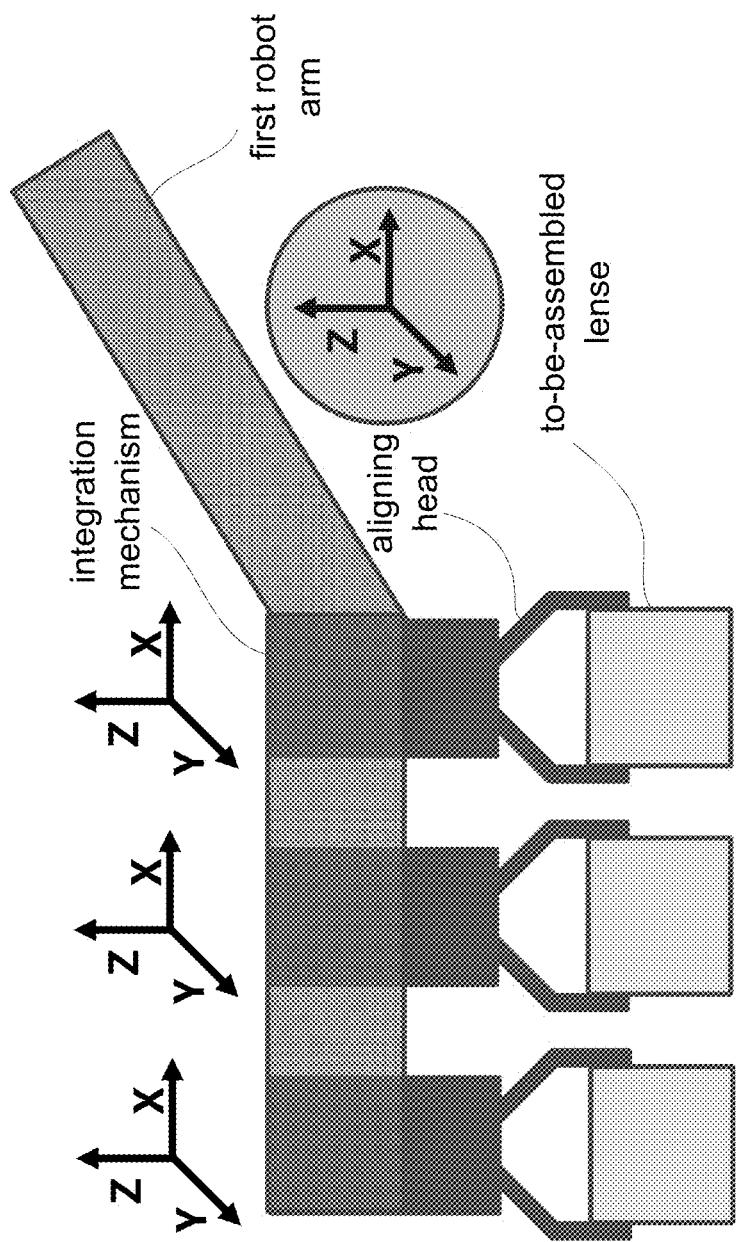
FIG. 3b is another schematic structural diagram of an alignment mechanism 122 according to an embodiment of the present disclosure.

To meet the needs for assembling a plurality of to-be-assembled lenses at the same time, as shown in FIG. 3a and FIG. 3b, the the alignment mechanism further includes: an integration mechanism, which is connected with the first robot arm, and is configured to integrate a plurality of aligning heads on the first robot arm. In the embodiments described above, the first robot arm may perform a three-axis movements in the X, Y, and Z directions according to the control instructions of the controller 11, and a plurality of aligning heads on the integrated mechanism may also independently perform the three-axis movements in the X, Y, and Z directions. The first robot arm may move the to-be-assembled lenses from the loading rack to the operating position of the alignment mechanism 122, and a plurality of aligning heads on the integration mechanism may respectively move the grasped to-be-assembled lenses to the theoretical positions thereof. Of course, the first robot arm and a plurality of aligning heads on the integrated mechanism may also perform six-axis movement (X, Y, Z, θX, θY, and θZ) or even other multi-axis movement as required under control instructions of the controller 11. There is no limitation in the embodiments of the present disclosure.

In some embodiments, the dispensing mechanism 125 may perform dispensing on the to-be-assembled optical part moved to the operating position of the dispensing mechanism 125. In the dispensing operation, the dispensing mechanism 125 may apply a specific glue to the to-be-assembled optical part by coating, potting or dripping, so that the dispensing portion has a certain viscosity, and then to-be-assembled lenses may be fixed after the to-be-assembled lenses are aligned, to finally obtain a complete product of optical module. The dispensing mechanism 125 may perform a dispensing operation before or after the to-be-assembled lenses are aligned, and there is no limitation on the order in the present embodiment.

In some embodiments, the dispensing mechanism 125 includes a second robot arm electrically connected to the controller, and a UV dispensing syringe mounted on the second robot arm. The second robot arm can bring the UV dispensing syringe to a designated dispensing position under the control of the controller 11, and the UV dispensing syringe performs a dispensing operation. More particularly, the UV dispensing syringe may store UV (Ultraviolet Rays) glue therein, i.e., shadowless glue, also known as photosensitive glue or ultraviolet curing glue, which has high adhesion and may be cured rapidly, which may indirectly improve the efficiency in assembling optical modules.

Figure 4:
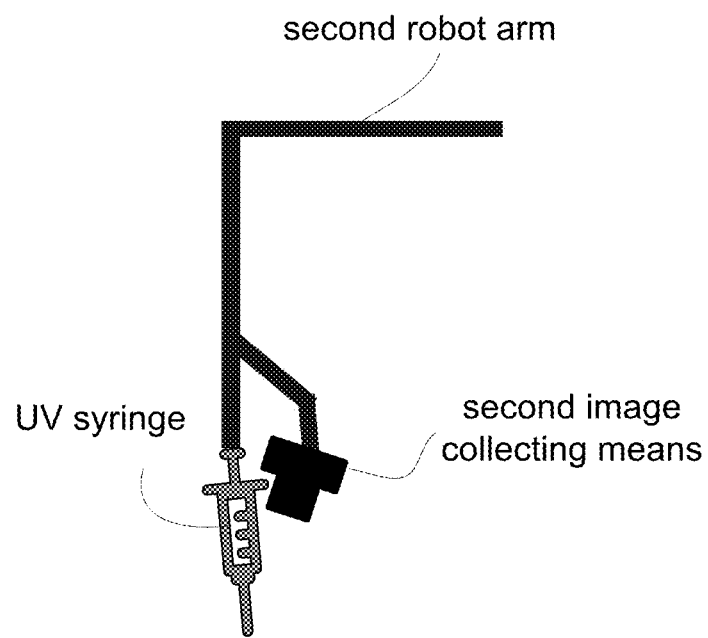
FIG. 4 is a schematic structural diagram of a dispensing mechanism 125 according to an embodiment of the disclosure.

In some embodiments, as shown in FIG. 4, to ensure that the dispensing mechanism 125 perform the dispensing operation at the right position, a second image collecting means may be mounted on the second robot arm. The second image collecting means may capture an actual image of the to-be-assembled optical part before dispensing, and send the captured image to the controller 11. The controller 11 performs recognition on the received image, determines a dispensing position, and sends a specific dispensing instruction to the dispensing mechanism 125.

In some embodiments, a UV lamp may be provided on the alignment mechanism 125. The UV lamp may be electrically connected to the controller and receive a curing instruction from the controller 11, light after the alignment of the to-be-assembled lendse to accelerate the curing of the UV glue and improve the efficiency in assembling optical modules.

In some embodiments, the power supply 123 may supply power to the to-be-assembled optical part moved to the operating position of the alignment mechanism 122, so that the optical module to be aligned generates an image. In some embodiments, according to the performance of optical modules, a light source is provided in some of to-be-assembled optical parts, such as a semi-finished product of a micro-projection module. After the light source is turned on, image may be generated at the image side of optical module to be aligned. In order to illuminate the to-be-assembled optical part by the light source, a power supply carrying mechanism may be provided on the working bench. The power supply carrying mechanism may carry an outputting of the power supply to a power inputting of the to-be-assembled optical part moved to the operating position of the alignment mechanism.

It should be understood that, for a to-be-assembled optical part without a light source, such as a semi-finished product of a camera module, in order to image such to-be-assembled optical part, the apparatus for assembling optical module provided in the embodiment further includes a light source. In some embodiments, for the optical module to be aligned on the fixture moved to the operating position of the alignment mechanism, the light source is located on the object side of the optical module to be aligned, and parallel light may be generated to make the optical module to be aligned generate image. The light source may be connected to the power source, and its switching state may be controlled by the controller.

In some embodiments, the first image collecting means 124 may collect a light spot of the image generated by the optical module to be aligned and feed it back to the controller 11. It should be noted that the first image collecting means 124 may be provided in a standard direction in which the optical module to be assembled as a target emits light, and then in the process of continuously adjusting the position of the to-be-assembled lens to achieve alignment, the light spot captured by the first image collecting means 124 may have meaning in reference.

In some embodiments, the controller 11 may generate an aligning instruction according to the quality of the light spot fed by the first image collecting means 124 and output the aligning instruction to the alignment mechanism 122. The imaging quality of the light spot may include the position of the light spot and the size of the light spot. By analyzing the quality of the light spot and the size of the light spot, it can be determined whether the to-be-assembled lens are aligned.

In some embodiments, a sensor may be provided on each of the plurality of fixtures 130 and configured to detect whether a to-be-assembled optical part is placed on the fixture. For example, a pressure sensor may be provided at the bottom of the fixture. If an to-be-assembled optical part is already placed on the fixture, the pressure sensor may detect a pressure change and send the pressure change to the controller 11. For example, an infrared or ultrasonic sensor may be provided on the fixture. If the to-be-assembled optical part is already placed on the fixture, the infrared or ultrasonic sensor may detect a change in the time difference between transmitting and receiving signals and send the change to the controller 11. The control 11 may determine whether there is an to-be-assembled optical part on the fixture according to the signal sent by the sensor, and then generate a corresponding operating instruction to avoid the idle operation of the mechanical component.

For example, the to-be-assembled optical part has been placed on the fixture moved to the operating position of the manipulor 121, and at this time, the controller 11 may send a operation-stop instruction to the manipulor 121 to avoid repeated operations. For another example, there is no to-be-assembled optical part on the fixture moved to the operating position of the dispensing mechanism 125, and at this time, the controller 11 may send a operation-stop instruction to the dispensing mechanism 125 to avoid dispensing by the dispensing mechanism 125 on the empty fixture.

It should be noted that the plurality of mechanical components 120 include the manipulator 121, the alignment mechanism 122, the power source 123, the first image collecting means 124, and the dispensing mechanism 125 described above, but are not limited to the mechanical means as described above. That is to say, the apparatus for assembling optical module provided by the present disclosure may further include other mechanical means as required, for example, a blanking robot, which may transfer an optical module from the fixture to a cutting area after obtaining the optical module. As another example, the apparatus for assembling optical module provided by the present disclosure may further include a product labeling means, which may stick a product label on an optical module obtained after being assembled.

In the present embodiments, the fixtures on the conveying means follows the movement of the conveying means, a plurality of mechanical components configured to perform active alignment on optical module may perform corresponding operations on the fixtures moved to respective operating position at the same time at multi-positions when the fixtures stop. Furthermore, the fixtures may be sequentially in each assembling operations, and a plurality of mechanical components may sequentially perform corresponding operations on the fixtures moved to its operating position, so that the accuracy in assembling optical modules can be improved with improved efficiency in assembling.

Furthermore, the first image collecting means is adopted to capture the light spot of image in real time during the alignment process, and the position of the to-be-assembled lens is adjusted according to the quality of the light spot of the image, which may effectively reduce the assembly tolerance of the entire optical module and improve the accuracy in assembling optical modules so as to effectively ensure the optical performance of the optical module.

Figure 5:
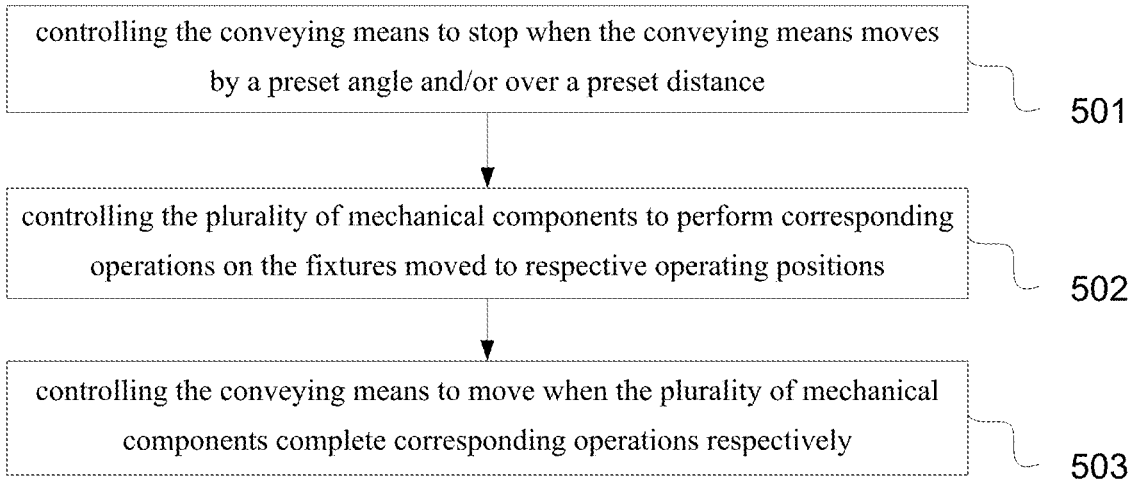
FIG. 5 is a method flowchart of a method for assembling optical module according to an embodiment of the present disclosure.

FIG. 5 is a method flowchart of a method for assembling optical module according to an embodiment of the present disclosure. With reference to FIG. 5, the method includes:

Step 501, controlling the conveying means to stop when the conveying means moves by a preset angle and/or over a preset distance.

Step 502, controlling the plurality of mechanical components to perform corresponding operations on the fixtures moved to respective operating positions.

Step 503, controlling the conveying means to move when the plurality of mechanical components complete corresponding operations respectively.

In the step 501, the preset angle may be determined according to an angle between a plurality of fixtures on the conveying means. For example, the angle between a plurality of fixtures on the conveying means is 45°, and the angle for each movement of conveying means may be set as 45°. The preset distance may be determined according to a distance between a plurality of fixtures on the conveying means. For example, the distance between a plurality of fixtures on the conveying means is 10 cm, a distance for each movement of the conveying means may be set as 10 cm.

In the step 502, the plurality of mechanical components may include: a manipulator, an alignment mechanism, a power supply, a first image collecting means, and a dispensing mechanism.

In some embodiments, the controlling the plurality of mechanical components to perform corresponding operations on the fixtures moved to respective operating positions may include the operations of: controlling the manipulator to place a to-be-assembled optical part on a fixture moved to the operating position of the manipulator; and controlling the dispensing mechanism to perform dispensing on the to-be-assembled optical part moved to the operating position of the dispensing mechanism; and controlling the power supply to supply power to the to-be-assembled optical part moved to the operating position of the alignment mechanism; and controlling the alignment mechanism to place a to-be-assembled lense to the to-be-assembled optical part moved to the operating position of the alignment mechanism to obtain an optical module to be aligned and to adjust a position of the to-be-assembled lense according to an aligning instruction of the controller; and controlling the first image collecting means to collect a light spot of an image generated by the optical module to be aligned, and to generate an aligning instruction according to a quality of the light spot and output the aligning instruction to the alignment mechanism.

In some embodiments, before the controlling the plurality of mechanical components to perform corresponding operations on the fixtures moved to respective operating positions, in the present embodiment, a sensor provided on each of the plurality of fixtures may be used to detect whether a to-be-assembled optical part is placed on the fixture, with respect to the each fixture, corresponding operating instruction, such as operating instruction of starting or stopping, may be sent out to the mechanical component corresponding to the operating position where the fixture is located according to the result of detecting.

It should be understood that, when there is an operating target, the operations at the operating position of manipulor, dispensing mechanism, and the alignment mechanism may be performed at the same time, so as to achieve a high assembling efficiency.

In the step 503, when the plurality of mechanism components completed respective operations, the conveying means may be controlled to perform another movement so as to convey the fixture at current operating position to the next operating position and bring the fixture at the previous operating position to the current operating position.

In the present embodiments, the fixtures on the conveying means follows the movement of the conveying means, a plurality of mechanical components configured to perform active alignment on optical module may perform corresponding operations on the fixtures moved to respective operating position at the same time at multi-positions when the fixtures stop. Furthermore, the fixtures may be sequentially in each assembling operations, and a plurality of mechanical components may sequentially perform corresponding operations on the fixtures moved to its operating position, so that the accuracy in assembling optical modules can be improved with improved efficiency in assembling.

Figure 6:
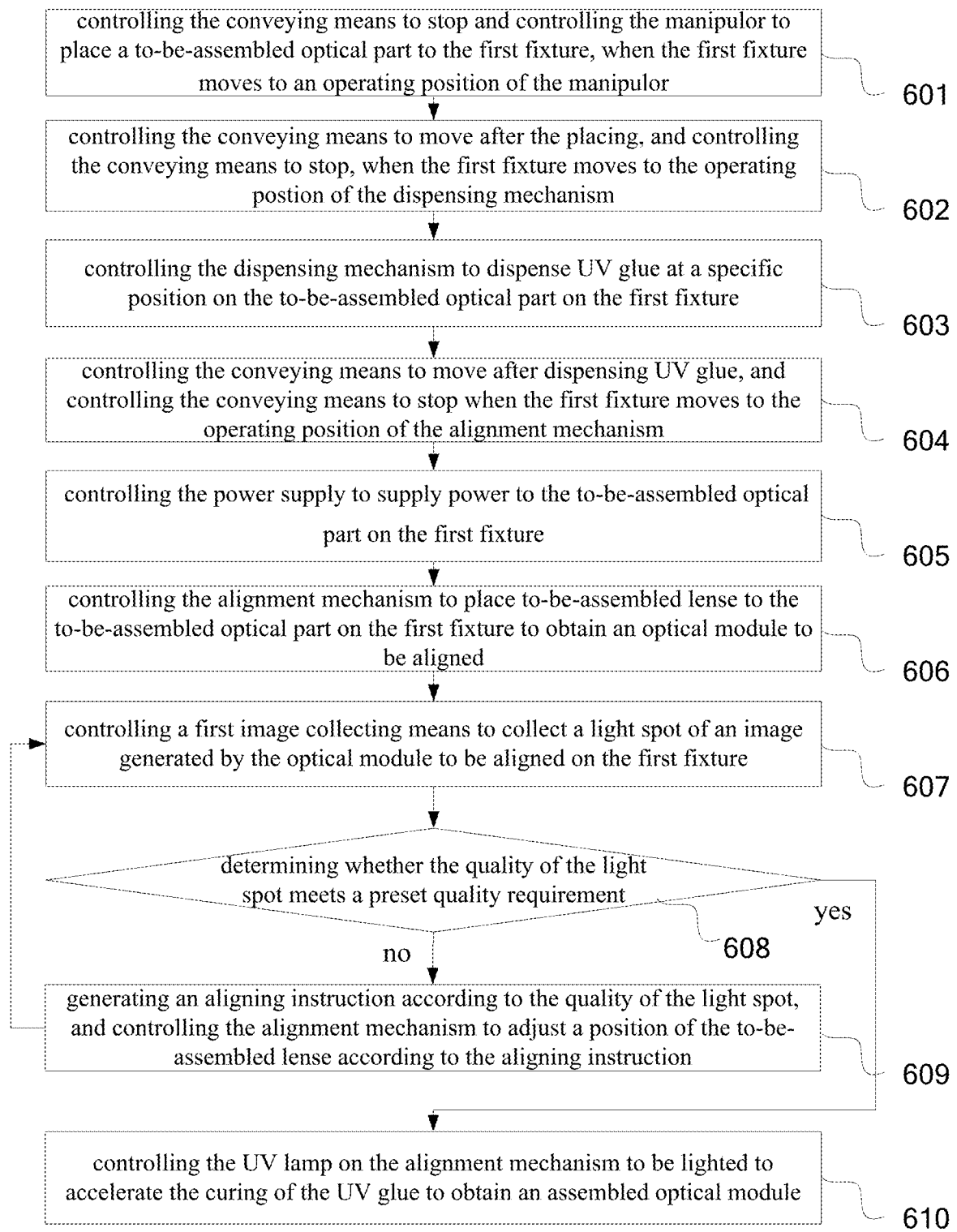
FIG. 6 is a method flowchart of a method for assembling optical module according to another embodiment of the present disclosure.

FIG. 6 is a method flowchart of a method for assembling optical module according to another embodiment of the present disclosure. In the following, reference may be made to FIG. 6 with any fixture of the plurality of fixtures as an example, detailed description may be made to the method for assembling an optical module provided by an embodiment of the present disclosure. For convenience of description, the any fixture of the plurality of fixtures may be marked as a first fixture. As shown in FIG. 6, the method includes:

Step 601, controlling the conveying means to stop and controlling the manipulor to place a to-be-assembled optical part to the first fixture, when the first fixture moves to an operating position of the manipulor.

Step 602, controlling the conveying means to move after the placing, and controlling the conveying means to stop, when the first fixture moves to the operating position of the dispensing mechanism.

Step 603, controlling the dispensing mechanism to dispense UV glue at a specific position on the to-be-assembled optical part on the first fixture.

Step 604, controlling the conveying means to move after dispensing UV glue, and controlling the conveying means to stop when the first fixture moves to the operating position of the alignment mechanism.

Step 605, controlling the power supply to supply power to the to-be-assembled optical part on the first fixture.

Step 606, controlling the alignment mechanism to place to-be-assembled lense to the to-be-assembled optical part on the first fixture to obtain an optical module to be aligned.

Step 607, controlling a first image collecting means to collect a light spot of an image generated by the optical module to be aligned on the first fixture.

Step 608, determining whether the quality of the light spot meets a preset quality requirement; and performing step 609, when the quality does not meet the quality requirement, and performing step 610, when when the quality meets the quality requirement.

Step 609, generating an aligning instruction according to the quality of the light spot, and controlling the alignment mechanism to adjust a position of the to-be-assembled lense according to the aligning instruction, and perform the step 607.

Step 610, controlling the UV lamp on the alignment mechanism to be lighted to accelerate the curing of the UV glue to obtain an assembled optical module.

It should be noted that the present embodiment only describes an embodiment of the method for assembling optical module provided by the present disclosure, and is not the entire implementation content of the present disclosure. In the present embodiment, the dispensing operation is performed first in step 603, and after the dispensing, step 604 is performed to start the aligning operation. However, in implementation, there is no limitation on the sequence of dispensing and aligning of the present disclosure. The aligning may be performed first and after the aligning (the light spot meets the quality requirement), the dispensing may be performed.

In some embodiments, in the controlling the dispensing mechanism to perform dispensing on the to-be-assembled optical part moved to the operating position of the dispensing mechanism, a realtime image of the to-be-assembled optical part moved to the operating position of the dispensing mechanism may be acquired by a second image collecting means in the dispensing mechanism; a dispensing position may be determined according to the realtime image; the second robot arm in the dispensing mechanism may be controlled according to the dispensing position to bring a UV dispensing syringe to perform a dispensing operation. With such steps, mistakes of dispensing position may be avoided and the quality of products of the assembled optical module may be improved. In the embodiment of the present disclosure, in assembling the to-be-assembled lense, the first image collecting means may feed back the quality of the light spot of the image in real time, and the controller may generate an aligning instruction according to the quality of the spot light in real time, and the alignment mechanism may adjust the position of the to-be-assembled lense at suitable timing according to the aligning instruction, and the to-be-assembled lense may be fixed to obtain an optical module when the quality of the light spot meets the preset quality requirement. With such assembling method, the assembly tolerance of the entire optical module may be effectively reduced and the accuracy in assembling optical modules can be improved with improved efficiency in assembling.

In addition, some processes described in the above embodiments and drawings include a plurality of operations that occur in a specific sequence, but it should be understood that these operations may be performed in a sequence different from the sequence described in the present disclosure or in parallel. The sequence numbers of operations, such as 101 and 102, are merely used to distinguish different operations. The sequence numbers themselves do not represent any execution sequence. In addition, these processes may include more or fewer operations, and these operations may be performed sequentially or in parallel. It should be noted that the expressions, such as "first" and "second" in the present disclosure are used to distinguish different messages, devices, modules, etc., and do not represent the sequence, nor do they limit "first" and "second" as different types.

It should also be noted that the terms of "including", "containing" or any other variation thereof are intended to encompass non-exclusive inclusions, so that a product or system that includes a series of elements includes not only those elements but also other elements that are not explicitly listed, or elements that are inherent to this commodity or system. Without much limitation, the elements defined by the expression of "including a . . . " does not exclude the existence of other same elements in the product or system including elements as stated.

The above embodiments are only used to describe the technical solution of the present disclosure, and are not limited thereto. Although the present disclosure has been described in detail with reference to the foregoing embodiments, the skilled in the art should understand that they can still modify the technical solutions described in the foregoing embodiments, or equivalently replace some of the technical features thereof. These modifications or replacements do not deviate the essence of the corresponding technical solutions from the spirit and scope of the technical solutions of the embodiments of the present disclosure.

The invention claimed is:

1. An apparatus for assembling optical module, comprising:
a working bench;
a controller; and
a plurality of mechanical components for active alignment of optical modules,
wherein:
a conveying mechanism is provided on the working bench, and a plurality of fixtures are provided on the conveying mechanism with even space therebetween and are movable with the conveying mechanism;
a positional relationship between two adjacent mechanical components of the plurality of mechanical components is determined by the positional relationship between two adjacent fixtures of the plurality of fixtures;
the controller is configured to control a movement of the conveying mechanism, and control the conveying mechanism to stop every time the conveying mechanism moves over a preset distance, and control the plurality of mechanical components to perform corresponding operations on the fixtures moved to respective operating positions; and
the plurality of mechanical components are configured to perform corresponding operations on the fixtures moved to respective operating positions under control of the controller;
wherein:
the plurality of mechanical components include: an alignment mechanism, and a first image collecting mechanism;
the alignment mechanism is configured to place a to-be-assembled lens to a to-be-assembled optical part moved to the operating position of the alignment mechanism to obtain an optical module to be aligned, and adjust a position of the to-be-assembled lens according to an aligning instruction of the controller;

the first image collecting mechanism is configured to collect a light spot of an image generated by the optical module to be aligned and feed it back to the controller; and the controller is configured to generate an aligning instruction according to a quality of the light spot and output the aligning instruction to the alignment mechanism.

2. The apparatus according to claim 1, wherein:
the plurality of mechanical components include:
a manipulator,
a power supply,
and
a dispensing mechanism;
the manipulator is configured to place a to-be-assembled optical part on a fixture moved to the operating position of the manipulator;
the dispensing mechanism is configured to perform dispensing on the to-be-assembled optical part moved to the operating position of the dispensing mechanism; and
the power supply is configured to supply power to the to-be-assembled optical part moved to the operating position of the alignment mechanism, so that the optical module to be aligned generates an image.

3. The apparatus according to claim 2, wherein:
a power supply carrying mechanism is provided on the working bench; and
the power supply carrying mechanism is configured to carry an outputting of the power supply to a power inputting of the to-be-assembled optical part moved to the operating position of the alignment mechanism.

4. The apparatus according to claim 2, wherein the alignment mechanism comprises:
a first robot arm electrically connected to the controller, and
an aligning head provided on the first robot arm, the aligning head including:
a vacuum chuck or an adjustable mechanical clamp.

5. The apparatus according to claim 4, wherein the alignment mechanism further comprises:
an integration mechanism that is connected with the first robot arm and is configured to integrate a plurality of aligning heads on the first robot arm.

6. The apparatus according to claim 2, wherein the dispensing mechanism comprises:
a second robot arm electrically connected to the controller, and
a UV dispensing syringe mounted on the second robot arm.

7. The apparatus according to claim 6, wherein the dispensing mechanism further comprises:
a second image collecting mechanism mounted on the second robot arm.

8. The apparatus according to claim 6, wherein a UV lamp is provided on the alignment mechanism and electrically connected to the controller.

9. The apparatus according to claim 1, wherein a sensor is provided on each of the plurality of fixtures and configured to detect whether a to-be-assembled optical part is placed on the fixture.

10. The apparatus according to claim 1, wherein the conveying mechanism comprises:
a turntable or a conveyor.

11. A method for assembling optical module applicable to the apparatus according to claim 1, comprising:
controlling the conveying mechanism to stop when the conveying mechanism moves over a preset distance;
controlling the plurality of mechanical components to perform corresponding operations on the fixtures moved to respective operating positions; and
controlling the conveying mechanism to move when the plurality of mechanical components complete corresponding operations respectively.

12. The method according to claim 11, wherein the controlling the plurality of mechanical components to perform corresponding operations on the fixtures moved to respective operating positions comprises:
controlling a manipulator to place a to-be-assembled optical part on a fixture moved to the operating position of the manipulator;
controlling a dispensing mechanism to perform dispensing on a to-be-assembled optical part moved to an operating position of the dispensing mechanism;
controlling a power supply to supply power to a to-be-assembled optical part moved to an operating position of the alignment mechanism;
controlling an alignment mechanism to place a to-be-assembled lens to the to-be-assembled optical part moved to the operating position of the alignment mechanism to obtain an optical module to be aligned, and controlling the alignment mechanism to adjust a position of the to-be-assembled lens according to an aligning instruction of the controller; and
controlling a first image collecting mechanism to collect a light spot of an image generated by the optical module to be aligned, and to generate an aligning instruction according to a quality of the light spot and output the aligning instruction to the alignment mechanism.

13. The method according to claim 11, wherein before the controlling the plurality of mechanical components to perform corresponding operations on the fixtures moved to respective operating positions, the method further comprises:
detecting whether a to-be-assembled optical part is placed on the fixture by a sensor provided on each of the plurality of fixtures, with respect to each fixture.

14. The method according to claim 11, wherein controlling a dispensing mechanism to perform dispensing on the to-be-assembled optical part moved to the operating position of the dispensing mechanism comprises:
acquiring a real time image of the to-be-assembled optical part moved to the operating position of the dispensing mechanism by a second image collecting mechanism in the dispensing mechanism;
determining a dispensing position according to the real time image; and
controlling a second robot arm with a UV dispensing syringe according to the dispensing position to perform a dispensing operation.

15. The method according to claim 11, wherein after generating an aligning instruction according to a quality of a light spot and outputting the aligning instruction to an alignment mechanism, the method further comprises:
lighting a UV lamp on the alignment mechanism to irradiate at a dispensing site of the to-be-assembled optical part, so as to fix the to-be-assembled lenses to obtain an optical module.

* * * * *